(12) United States Patent
Arnason

(10) Patent No.: US 12,708,122 B2
(45) Date of Patent: Aug. 18, 2026

(54) DEVICE FOR HEATING AND COOLING FOOD ITEMS

(71) Applicant: LAMBHUSASUND EHF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 648 days.

(21) Appl. No.: 18/003,600

(22) PCT Filed: Jun. 29, 2021

(86) PCT No.: PCT/IS2021/050010
§ 371 (c)(1),
(2) Date: Dec. 28, 2022

(87) PCT Pub. No.: WO2022/003734
PCT Pub. Date: Jan. 6, 2022

(65) Prior Publication Data

US 2023/0309571 A1 Oct. 5, 2023

(30) Foreign Application Priority Data

Jun. 29, 2020 (IS) ........................................ 050309
Jun. 29, 2020 (IS) ........................................ 050310

(51) Int. Cl.
*A22C 25/08* (2006.01)
*A01K 63/02* (2006.01)
(Continued)

(52) U.S. Cl.
CPC .............. *A22C 25/08* (2013.01); *A01K 63/02* (2013.01); *A01K 63/065* (2013.01);
(Continued)

(58) Field of Classification Search
None
See application file for complete search history.

(56) References Cited

U.S. PATENT DOCUMENTS 690,005 A * 12/1901 Anderson et al. .. A47J 37/1214 134/132
1,088,113 A * 2/1914 Valerius ................. B01F 35/95 165/92
(Continued)

FOREIGN PATENT DOCUMENTS

EP 0237262 A2 9/1987
EP 0550836 A2 7/1993
(Continued)

OTHER PUBLICATIONS

International Search Report and Written Opinion dated Oct. 14, 2021 for corresponding International Application No. PCT/IS2021/050010.
(Continued)

*Primary Examiner* — Thor S Campbell
(74) *Attorney, Agent, or Firm* — Tarolli, Sundheim, Covell & Tummino LLP

(57) ABSTRACT

The present invention relates to a method and a device for treating and/or transporting food items. The apparatus and method are designed to facilitate treating animals or food items in liquid. The device of the present invention is designed as a spiral shaped channel with one or more channels wound together around an axis. The apparatus of the present invention and the use thereof provides a method to heat or cool food items in a spiral shaped channel device.

12 Claims, 7 Drawing Sheets

(51) Int. Cl.

| | |
|---|---|
| ***A01K 63/06*** | (2006.01) |
| ***A22B 5/00*** | (2006.01) |
| ***A22C 17/00*** | (2006.01) |
| ***A22C 21/00*** | (2006.01) |
| ***A23B 4/005*** | (2006.01) |
| ***A23B 4/06*** | (2006.01) |
| ***F28D 7/04*** | (2006.01) |

(52) U.S. Cl.

CPC ............ *A22B 5/0076* (2013.01); *A22C 21/00* (2013.01); *A23B 4/0053* (2013.01); *A23B 4/062* (2013.01); *F28D 7/04* (2013.01); *A22C 17/00* (2013.01)

(56) References Cited

U.S. PATENT DOCUMENTS

| | | | | | |
|---|---|---|---|---|---|
| 2,271,862 | A * | 2/1942 | Hodgdon | A23B 11/1303 | 165/92 |
| 3,586,510 | A * | 6/1971 | Farkas et al. | A23L 5/11 | 99/452 |
| 3,760,716 | A * | 9/1973 | Stevenson, III | A22C 29/00 | 99/536 |
| 4,296,072 | A | 10/1981 | Takacs | | |
| 4,422,773 | A * | 12/1983 | Cassaday | B01F 25/433 | 366/341 |
| 4,444,553 | A * | 4/1984 | Christodoulou | B01J 8/382 | 432/15 |
| 4,482,253 | A * | 11/1984 | Golobic | F28D 11/04 | 366/147 |
| 4,522,587 | A * | 6/1985 | Miller | C10C 3/10 | 165/92 |
| 4,596,286 | A * | 6/1986 | Stetler | F28D 11/04 | 165/92 |
| 4,733,607 | A * | 3/1988 | Star | B01F 27/82 | 366/85 |
| 4,860,554 | A * | 8/1989 | Innes | A23B 4/064 | 62/380 |
| 5,083,506 | A * | 1/1992 | Horn | B01F 27/721 | 366/97 |
| 5,133,249 | A * | 7/1992 | Zittel | A23B 2/465 | 134/132 |
| 5,165,330 | A * | 11/1992 | Giacomini | A47J 37/1214 | 134/132 |
| 5,233,916 | A * | 8/1993 | Butler | A47J 27/10 | 366/195 |
| 5,259,302 | A * | 11/1993 | Chen | G07F 17/0085 | 99/405 |
| 5,275,091 | A * | 1/1994 | McFarlane | A23B 7/005 | 99/356 |
| 5,802,961 | A * | 9/1998 | Hay | A23B 7/0053 | 366/136 |
| 6,263,785 | B1 * | 7/2001 | Zittel | A47J 37/1214 | 426/523 |
| 6,268,590 | B1 * | 7/2001 | Gale | C22B 43/00 | 75/670 |
| 6,578,468 | B1 * | 6/2003 | Horn | B01F 27/1143 | 366/144 |
| 7,735,415 | B2 * | 6/2010 | Zittel | A23B 7/06 | 134/132 |
| 7,784,397 | B2 * | 8/2010 | Vedsted | A23B 4/005 | 99/356 |
| 8,087,348 | B2 * | 1/2012 | Maupin | B01D 29/58 | 99/348 |
| 8,191,466 | B2 * | 6/2012 | Maupin | A23N 12/023 | 99/348 |
| 10,631,562 | B2 * | 4/2020 | Cretors | A23L 7/161 | |
| 11,044,929 | B2 * | 6/2021 | Cretors | A23L 5/17 | |
| 12,357,014 | B2 * | 7/2025 | Zittel | A23N 12/04 | |
| 2003/0205034 | A1 * | 11/2003 | Sus | A47J 37/1228 | 53/564 |
| 2003/0205147 | A1 * | 11/2003 | Schackmuth | A47J 37/1228 | 99/336 |
| 2003/0205288 | A1 * | 11/2003 | Sus | B65B 43/305 | 141/83 |
| 2003/0207743 | A1 * | 11/2003 | Schackmuth | B65B 43/305 | 493/309 |
| 2008/0271610 | A1 * | 11/2008 | Vedsted | F28D 1/0213 | 99/352 |
| 2018/0036773 | A1 * | 2/2018 | Arnason | A22C 25/08 | |
| 2019/0116812 | A1 * | 4/2019 | Arnason | A22B 5/0076 | |
| 2021/0153482 | A1 * | 5/2021 | Arnason | A23B 4/062 | |
| 2021/0153514 | A1 * | 5/2021 | Arnason | A22C 25/02 | |
| 2021/0307345 | A1 * | 10/2021 | Arnason | A23B 4/062 | |
| 2022/0202025 | A1 * | 6/2022 | Arnason | A22C 9/005 | |
| 2022/0386632 | A1 * | 12/2022 | Arnason | A22C 25/02 | |
| 2023/0051759 | A1 * | 2/2023 | Arnason | A23B 4/0053 | |
| 2023/0309571 | A1 * | 10/2023 | Arnason | A22C 21/00 | 426/231 |

FOREIGN PATENT DOCUMENTS

| | | | |
|---|---|---|---|
| WO | 2020012510 | A2 | 1/2020 |
| WO | 2020031215 | A1 | 2/2020 |

OTHER PUBLICATIONS

Iceland Search Report dated Oct. 13, 2020 for corresponding IS Application No. 050310.

* cited by examiner

DEVICE FOR HEATING AND COOLING FOOD ITEMS

RELATED APPLICATION DATA

The present application is a U.S. National Stage application under 35 USC 371 of PCT Application Serial No. PCT/IS2021/050010, filed on 29 Jun. 2021; which claims priority from IS Patent Application No. 050309, filed 29 Jun. 2020, and IS Patent Application No. 050310, filed 29 Jun. 2020, the entirety of each of which are incorporated herein by reference.

FIELD OF THE INVENTION

The invention relates to a method and a device for heating or cooling food items. Such method and device may, for instance, be used to cool slaughtered fish, chicken or even larger animals.

BACKGROUND

In the continuously developing field of food processing improved methods and devices are needed to increase speed of processing and reduce cost and environmental footsteps. Processing steps such as cooling, rinsing, transferring and bleeding of freshly slaughtered animals need to be able to facilitate fast, efficient but relatively gentle handling and transportation of the animals and food products through these processes.

A part of food processing steps includes bleeding of slaughtered animals, cooling and treating slaughtered animals and food items for bacteria, but one of the problems in the food industry is getting rid of bacteria such as Listeria in Salmon and Salmonella in chicken. For Listeria, the solution has been to freeze the salmon to get rid of these bacteria. This however poses a problem for delivery of fresh salmon for the market.

There is a long tradition of treating food items in liquid, such as water, brine and seawater for rinsing, bleeding, cooling and further processing. Limitation on fresh water sources, environmental issues and costs are driving the food industry to reduce and reuse water as much as possible and to work towards more effective devices for these processes.

Spiral pumps have been used to transport and treat food items delicately through a closed environment in a low-pressure system. Such pumps are ideal for pumping water-mixed material such as raw and cooked shrimp, shellfish and pelagic and other small fish according to the principle of Archimedes. By rotating slowly, the pump facilitates transport and/or elevation of water and material through pipes, without using any propeller. The food items are gently conveyed in a closed environment. The system also prevents the items from being exposed to the outside environment.

WO 2018/185791 discloses a spiral pump with a tubing that is helically wound around a frame structure which rotates around a horizontal axis further having a second tubing, which is wound through the inlet of the first tubing and into the second winding. The method is performed by introducing a calculated amount of liquid and food items into the first winding of the spiral pump and then rotating the tubing only one circle at the time to move the food items in the liquid into the second winding before introducing additives, such as ozone, into the second winding through a second tubing for killing bacteria and for transporting items from one location to another at the same time.

WO 2020/012509 discloses an apparatus and a method to treat food items in a spiral pump, where the food items are treated cycle by cycle in the pump at various speed in each cycle and or with a rocking movement of the pump, where the tubing is wound around the frame of the pump or with other shape to increase movement of the food items in the pump.

SUMMARY OF THE INVENTION

The present invention provides a method and a device for treating food items in liquid in a channel device in a temperature-controlled process, where the food items to be treated pass through a channel in liquid. The invention provides a solution of treating food items in liquid where the regulation of temperature in the channel of the device is regulated by heat exchange into the channel from outside the channel, such that the heat exchange medium is not in contact with the food items in the channel. This is beneficial for example when only water and ice can be used for cooling the food items, such as for treating poultry. However, when cooling the food items such as fish, a combination of chilled saline solution in the channel and the cooling media outside the channel can be used to facilitate the heat exchange in the cooling process. The apparatus of the present invention provides a solution where food items can be transported, treated and/or cooled or heated in water, using other heat exchange agents to facilitate the heat exchange from outside the treatment portion of the device and thereby bringing the liquid in the transport/treatment/heating or cooling portion of the device to and maintaining it at an optimal temperature.

Traditional setups for using liquid heat exchange medium such as glycol for cooling food items use freon or ammonia to cool down the glycol in a first heat exchange step and then the glycol is used to cool down liquid, such as water or saline solution, in a second heat exchange step. The cooled liquid is then mixed with the food items for the third heat exchange step between the liquid and the food items. The present invention provides an apparatus and method using two heat exchange units, where the second heat exchange unit is positioned within the first heat exchange unit. The first heat exchange unit is a chamber with liquid heat exchange medium, such as glycol, where the second heat exchange unit has a channel which is at least partially exposed to the first heat exchange medium through a surface of the channel. The food items are passed through the channel in liquid, which is defined as the second heat exchange medium. In this system the second and the third step of traditional heat exchange systems are combined, and the food items are subjected to heat exchange both from the liquid and from the surface of the channel.

In some embodiments the apparatus comprises a drum is housed in a chamber filled with liquid heat exchange medium, where the food items are transported through the drum for heat exchange and optionally treatment as well. The drum comprises one or more channels extending from an in-feed opening to an out-feed opening in a horizontal operational direction.

In some embodiments the channel of the drum is formed in a spiral or helix formation with spiral shaped channel providing operation according to the principle of Archimedes, where food items and liquid occupy the lower half of each winding with an air-phase in the upper half of each winding. As the spiral shaped channel is rotated, the food items in liquid are advanced through the spiral and the air-phase behind the food items in liquid in the lower half of each winding is pushed out of the channel and upwards if the out-feed end of the channel is raised above the centre part of the drum.

In some embodiments the channel(s) of the second heat exchange unit are formed in a spiral or have a helix formation with spiral shaped channel providing operation according to the principle of Archimedes to advance items in a substantially horizontal or upward direction. Each winding of each channel may be filled with liquid and food items or have food items and liquid occupying the lower half of each winding and an air-phase in the upper half of each winding. As the spiral shaped channel(s) are rotated, the food items in liquid are advanced through the spiral.

In some embodiments the drum of the device of the present invention has an inner hollow core and an outer surface, where the one or more channels are formed in a spiral between the core and the outer surface. The core and the outer surface define the inner and outer perimeter of each channel together with the walls separating the channels in the drum. A drum can have one spiral shaped channel winding through the drum, where a single wall or spiral shaped blade separates each two adjacent windings in the channel in the drum. A drum can also have a plurality of parallel arranged spiral shaped channels wound together between the core and the outer surface.

In some embodiments the apparatus of the present invention can be described as a transport and treatment device as the food items are transported through the device in the mechanical operation of the device. The transport element is due to the design of the channels and the operation according to the principle of Archimedes, whereas the treatment element comes from the heat exchange facilitated by the temperature of the liquid in the chamber of the device and optionally additives in the liquid used for transporting the food items through the device. Structural formation in the channels further aid to treatment and increase the effect of the heat exchange process. The apparatus can be described having a first or outer heat exchange unit, being a chamber with liquid heat exchange medium, and a second or inner heat exchange unit, being a rotating drum unit submerged in the liquid heat exchange medium of the first heat exchange unit. The second or inner heat exchange unit has spiral or helical shaped channels for transporting and treating the food items in liquid as the pass through the channels. The air in the channels of the second heat exchange unit and in a core structure of the rotating drum unit assist with the load bearing of the second heat exchange unit in addition to the load bearing properties of the liquid in the chamber of the first heat exchange unit. By using glycol as the first heat exchange medium, it can be used both for heating and cooling the liquid and food items in the second heat exchange unit. Cleaning food processing devise is a real challenge, but the device of the present invention provides a simple solution where water can be pumped through the device after treatment of food items and the glycol can be heated to wash and sterilize the channels of the second heat exchange unit on a regular basis.

One of the challenges in the modern food industry is handling the quantity of slaughtered animals in a relatively short time to preserve the freshness of food items without compromising quality, securing food safety like for example reducing or eliminating bacteria in the process, and to ensure longer shelf life of the food items. This requires devices and processes which can handle a large quantity of food items in a short time period, requiring more effective machinery and methods. The drum of the device of the present invention can be formed to have a plurality of separate spiral shaped channels wound together inside the drum with a loading structure connected to each of a plurality of channels in the drum. The loading structure sequentially and continuously feeds food items in liquid into each of the plurality of the channels making sure that the first channel is fed with food items in liquid and air to provide a winding with less than 50% of food items in liquid and more than 50% of air phase. After filling the first winding of the first channel, the loading structure feeds the next channel in the same manner. This continues for the number of channels in the drum and then the process is repeated, providing a device and method where the device has a bulk of food items in liquid in different positions in the drum and where the drum is at any moment booth feeding in and exiting food items in liquid. This not only increases the effectivity of the device in terms of quantity/time unit in processing time, but it also reduces pulsing motion of the drum, which is a problem for devices working according to the spiral pump principle due to the in- and out-feeding as well as rotating material in the channel. An outfeed collecting structure connected to the outfeed end of each of the channels in the drum receives the food items in liquid and the air-phase in the drum at the out-feed end and exits the food items in liquid. Optionally, the outfeed collecting structure also separates the air-phase from the food items in liquid and is able to re-direct the air-phase back to the loading structure for re-use.

Another aspect of processing a large quantity of food items, is that it requires larger devices posing challenges such as cost of manufacturing, where the size of the devices starts to become a limiting factor. The treatment portion of the device presented herein is a drum submerged in a liquid. The core of the drum is filled with air and together with the air phase in each channel of the drum has therefore a load bearing function for the drum in the chamber. The drum is therefore lighter in terms of both load bearing and operations. Furthermore, in devices for processing a large quantity of food items there is the problem of providing all the food items with quality treatment. The device of the present invention is designed for cooling food items and in some embodiments to simultaneously facilitate other treatment of the food items. The device is in itself a heat exchange device where the heat exchange is mediated from the cooling media around the drum over the outer surface and into each channel of the drum to the liquid therein. In order to provide constant and continuous heat exchange effect for the food items, the channels in the drum are formed to facilitate movement or tumbling of food items in the channel to augment the effect of the treatment in the drum. This is obtained by structural features in the channel(s) of the drum, both in the side walls and the portion of the core forming the inner wall of the drum. By narrowing and widening the diameter of the channel, the flow rate of liquid in the spiral shaped channel is constantly altered, which constantly brings the liquid in contact with the outer surface and thereby maintains the desired temperature for the cooling process.

In some embodiments the device is made from thermal conductive material, such as steel, to provide thermal convection from the cooling media in the chamber to liquid in the channel. As the cooling process continues, the solution/liquid being used to transfer the food items through the spiral shaped channel may freeze and form a film on the inside of the channel. This will further facilitate cooling of the slaughtered animals or food items through both the chilled liquid in the cooling device as well as though the cold inner surface of the channel or the ice layer on the inside of the channel or ice crystals in the liquid. Formation of ice-film and ice-crystals inside the channel can be controlled when the liquid fed into the channel with the slaughtered animals or food items is a salt solution. When using the device for cooling process such a SUB-CHILLING a salt-controlled and temperature-controlled solution is used and in such processes ice formation is advantageous, whereas in brine freezing they are not wanted.

Due to the shape of the channels in the device, the principle of Archimedes is applied to bring the food items through the device where in practical terms the total amount of liquid, food items and additives in each winding of a spiral shaped channel does not exceed 50% of the volume of a winding ensures that the food items in each winding do not mix with the food items in the next winding. Furthermore, although the air phase in each winding occupies about 50% or more of the volume of the winding it does not flow over to the next winding due to the size of the core and the structural features in the shape of the core. According to the principle of Archimedes the liquid and the food items in each winding are mechanically moved forwards and the air phase in the upper half of each winding in the channel pushes the content of the channel out of the pump to levels above the centre of the rotating axis of the channel.

In some embodiments the apparatus of the present invention can be used for transporting or pumping food items in one direction to storing container and then used for transport or pumping the food items from the storage container back through the device in reverse direction due to the design of the channels and the in- and out-feed structure.

The combination of one or more of the following embodiments provide the solutions presented herein: a) the separation of the cooling media from the treatment chamber allows cooling food items in liquid other than the liquid medium surrounding the food items, b) providing cooling channel made from thermal conductive material for providing effective heat exchange through from the cooling medium to the liquid surrounding the food items in the channel, c) using a spiral shaped channel for the cooling process for the transfer the food items through the channel, and d) providing several structural features in the channels to ensure continuous movement of the food items and altering the flow rate of the liquid around the food items and thus increasing the effect of cooling of the device, which provides the improved device and method of the present invention.

It is an object of the present invention to overcome and/or ameliorate the aforementioned drawbacks of the prior art and to provide an improved and/or alternative and/or additional method or device for facilitating heating, cooling and/or treatment of food items in liquid. It is one preferred object of the present invention to provide an apparatus having an outer heat exchange unit and an inner heat exchange unit arranged within the outer heat exchange to heat or cool food items in liquid. Moreover, it is a preferred object of the present invention to provide a method, a system and device, preferably designed to use a first liquid heat exchange medium to facilitate heat exchange of food items in a second liquid heat exchange medium, where the first and second heat exchange medium are physically separated in the mechanics of the device to allow use of liquid heat exchange medium which cannot come in contact with food items. Another preferred object of the present invention is to provide a device having a design for cooling food items in liquid in a rotating heat exchange unit arranged within an outer heat exchange unit and having helical channels for advancing the food items through to facilitate the heat exchange. An important aspect of the present invention is provided by mechanical features of a rotating drum unit within and at least partially submerged in a first heat exchange unit, where the liquid heat exchange medium in the first heat exchange unit and optionally an air-phase within the drum unit provide load bearing properties and allow use of larger treatment unit for large quantity of food items.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus for heating or cooling food items in liquid. The apparatus comprises i) a first heat exchange unit, further comprising a chamber, a heat exchange device, and connections or tubing for feeding a first heat exchange medium to and from the chamber through the heat exchange device, ii) a second heat exchange unit, further comprising: one or more spiral-shaped channels for transporting food items in a second heat exchange medium through, an in-feed structure, and an out-feed structure, and iii) means for rotating the drum unit of second heat exchange unit. The one or more spiral-shaped channels of second heat exchange unit are rotatable around an axis in the chamber of the first heat exchange unit, and the one or more spiral-shaped channels of second heat exchange unit are at least partially submerged in the first heat exchange medium in the chamber of the first heat exchange unit.

Another preferred object of the present invention is solved by a method for heating or cooling food items in liquid. The method comprises the steps of a) feeding a first heat exchange medium to and from a chamber of a first heat exchange unit of an apparatus for heating or cooling food items in liquid through a heat exchange device for maintaining a desired temperature of the first heat exchange medium, b) feeding food items in a second heat exchange medium trough an in-feed structure into one or more spiral shaped channels of a second heat exchange unit, c) rotating the one or more spiral shaped channels of the second heat exchange unit to advance the food items in liquid through the second heat exchange unit, and d) feeding food items in liquid through an out-feed structure out of the one or more spiral shaped channels of the second heat exchange unit. The one or more spiral shaped channels of the second heat exchange unit are at least partially submerged in the first heat exchange medium in the chamber of the first heat exchange unit, and the temperature of the first heat exchange medium determines the temperature of the second heat exchange medium in the one or more channels of the second heat exchange unit through contact with an outer surfaces of the second heat exchange unit.

In applications where refrigerated sea water (RSW) is used to store and pump food items such as transfer of fish from storage containers in fishing vessels to shore, the temperature of the RSW rises during the transportation. This is both due to the fact that the distance in the piping allows the RSW to get warmer and in such systems, as it is customary to pump the RSW back to the reservoir to transport more items therefrom to the processing site resulting in increased temperature of the fish in the reservoir and increasing temperature of the fish pumped later in the process of emptying the reservoir. With increased temperature in the reservoir, the quality of the fish decreases and for example the fish at the bottom of the tank might get crushed under the weight of the fish above due to rising temperature of the RSW. Therefore, another preferred object of the present invention is solved by a system for transportation of fish in RSW. The system comprises a) one or more storage/transport containers onboard a fishing vessel for storing fish in RSW after catching, b) piping for transporting the fish in RSW or RSW to and from the one or more storage/transport containers, c) a device for heat exchange and transport of fish and RSW, where the device further comprising: i) a first heat exchange unit further comprising a chamber for storing a first heat exchange medium, ii) a second heat exchange unit arranged in the chamber of the first heat exchange unit, where the second heat exchange unit further comprising one or more spiral shaped channels rotatably arranged around an axis for transport and heat exchange of fish in RSW as they pass through the one or more spiral shaped channels, in-feed structure and an out-feed structure connected to the piping for transporting the fish in RSW or RSW to and from the one or more storage/transport containers. The second heat exchange unit is at least partially submerged in the first heat exchange medium in the chamber of the first heat exchange unit, and the fish in RSW or RSW only is transported through the second heat exchange unit when fish is being transported to or from the one or more storage/transport containers or when RSW only is being pumped/transported to and from the one or more storage/transport containers for temperature management of the RSW.

One of the preferred objects of the present invention is solved by an apparatus for heating or cooling food items, said apparatus comprising: i) a first heat exchange unit further comprising a chamber and a heat exchange device with tubing for feeding a first heat exchange medium to and from the chamber through the heat exchange unit, ii) a second heat exchange unit further comprising a drum unit formed by one or more parallel arranged spiral-shaped channels having an in-feed structure and an out-feed structure, where the in-feed structure and the out-feed structure feed food items in liquid sequentially and continuously into and out of each of the one or more parallel arranged spiral-shaped channels. The apparatus further comprises means for rotating the drum unit of second heat exchange unit, where the drum unit of second heat exchange unit is rotatably arranged around a substantially horizontal axis in the chamber of the first heat exchange unit, and where the drum unit of second heat exchange unit is at least partially submerged in the heat exchange medium in the chamber of the first heat exchange unit. The channels of the drum can be formed in many ways, but in one embodiment disclosed herein, each channel has a) an inner wall forming a hollow core along the substantially horizontal axis in the chamber, b) side walls separating each winding in a channel or separating each two or more parallel arranged spiral-shaped channels in the drum, where the side walls are formed by one or more spiral shaped blades mounted around a hollow core. The spiral blade has alternating positive and negative radial bends along the length of the spiral blade dividing the blade into sectors. Each two adjacent sectors can be defined as a functional unit between two positive radial bend, where one sector is directed in the negative advancing direction of the blade, thereby creating a backwards push of the material resting against that sector and the other sector is directed in the positive advancing direction of the blade and thereby creating a forward advancement of the material resting against that sector. The forward and backwards pushing of the material during the advancement along the length of the alternating positive and negative radial bends along the length of the spiral blade cause tumbling of the food items in the channel, but this movement and altering position of the items in the channel increase the effect of treatment of the food items. The alternating positive and negative radial bends along the length of the spiral blade also alter repeatedly the diameter in each channel creating an alternating increase and decrease in the flow of liquid around the food items in the channel. Further structural features in the components making up the core can also cause both changes in the flow rate of the liquid in the channel as well as facilitate further tumbling of the food items during the advancement through the channel of the device.

Another preferred object of the present invention is solved by an apparatus for transferring and/or treating living or slaughtered animals or food items in liquid. The apparatus comprises a i) heat exchange unit having one or more parallel arranged channels, where each parallel arranged channel comprises an in-feed end and an out-feed end, where each parallel arranged channel is formed into a spiral shaped channel having three or more windings, and ii) a motor means for rotating the heat exchange unit, where the apparatus further comprises a heat exchange unit for providing heat exchange for the liquid in the heat exchange unit from the outside of the heat exchange unit.

Another preferred object of the present invention is solved by an apparatus for transferring and/or treating food items in liquid. The apparatus comprises i) a chamber, ii) a heat exchange unit arranged in the chamber for rotating horizontally withing said chamber, where the heat exchange unit further comprises at least one channel, an in-feed end, and an out-feed end where the at least one channel is formed into a spiral shaped channel from the in-feed end to the out-feed end having a plurality of windings, and iii) means for rotating the drum. The chamber further comprises means for feeding liquid heat exchange medium into the chamber for keeping the drum submerged in said cooling medium.

Another preferred object of the present invention is solved by a system for heat exchange and transport of food items in liquid. The system comprises i) a first axis of rotation, ii) a first heat transmitting unit containing first heat exchange medium, iii) a second heat receiving and transporting unit containing second heat exchange and transport medium, where the second heat receiving and transporting unit further comprises iv) axially rotatable encapsulating structure, and v) an axial helical screw wall structure for conveying food items in liquid from an inlet to and outlet. The first heat exchange medium provides heat exchange effect to the liquid being used for transporting the food items through the second heat receiving and transporting unit for heating or cooling the food items during the transport through the second heat receiving and transporting unit.

Another preferred object of the present invention is solved by a system for heating or cooling food items in liquid. The system comprises i) providing a first heat exchange unit of an apparatus for heating or cooling food items in liquid and feeding a first heat exchange medium to and from a chamber of the first heat exchange unit through a heat exchange device for maintaining a desired temperature of the first heat exchange medium, ii) providing a second heat exchange unit and feeding food items in liquid trough an in-feed structure into one or more channels of the second heat exchange unit, iii) rotating the second heat exchange unit to advance the food items in liquid through the second heat exchange unit, and iv) feeding food items in liquid through an out-feed structure out of the one or more channels of the second heat exchange unit. The second heat exchange unit is at least partially submerged in the first heat exchange medium in the chamber of the first heat exchange unit, and the temperature of the first heat exchange medium determines the temperature of the liquid in the one or more channels of the second heat exchange unit through contact with an outer surfaces of the second heat exchange unit.

Another preferred object of the present invention is solved by an apparatus for heating or cooling food items in liquid. The apparatus comprises i) a first heat exchange unit having a chamber, a heat exchange device, and connections for feeding a first heat exchange medium to and from the chamber through the heat exchange device, ii) a second heat exchange unit, further comprising one or more spiral shaped channels for advancing food items in liquid through, an in-feed structure to feed food items into the one or more channels, and an out-feed structure to feed food items out of the one or more spiral shaped channels, iii) means for advancing the food items through the one or more spiral shaped channels. The one or more spiral shaped channels are at least partially submerged in liquid heat exchange medium in the chamber of the first heat exchange unit, and the first heat exchange unit further comprises means for blowing temperature regulated air onto the one or more spiral-shaped channels of second heat exchange unit to provide heat exchange for the portion of the one or more spiral shaped channels which are not submerged in liquid heat exchange medium.

DESCRIPTION OF THE INVENTION

The following definitions and embodiments relate to the method, the system and the apparatus of the invention.

In the present context the term "apparatus for heating or cooling food items in liquid" refers to an apparatus for heating or cooling food items in liquid through a heat exchange process, where the food items are transported or pumped through the apparatus and where the food items are optionally further treated in during the transportation or pumping through the apparatus.

In the present context the terms "channel", "duct" and "spiral shaped channel" refer to a closed hollow channel structure or tubular channels structure wound or formed in a helical formation around an axis from an in-feed end to an out-feed end having spiral shape and working according to the principle of Archimedes to advance liquid and food items in liquid along the channel. The term also relates to two or more parallel wound channels, each having an in-feed and an out-feed end, where the plurality of channels are wound in a spiral and where the plurality of channels are fed sequentially with food items in liquid to be transferred through the spiral shaped channels and out of the out-feed end of each spiral shaped channel.

In the present context the terms "treating food items", "treating food items in liquid" and "processing or treating food items in liquid" relate to rinsing, washing, bleeding, heating, cooling, sterilizing the food items, including adding substances to the food items being treated in liquid such as, but not limited to, salts, phosphates or anti-bacterial agents etc.

In the present context the term "food items" refers to any food items such as slaughtered animals, such as, but not limited to fish or chicken, as well as for parts of animals such as aquatic animals, birds or other smaller slaughtered animals. In some embodiments, the term "food items" refers to live animals, such as fish, for temporarily treating fish at an increased and/or decreased temperature.

In the present context the term "means for rotating the spiral shaped channels" refers to any drive means for rotating the channels in the apparatus to perform the pumping activity of the apparatus. Such drive means are selected from, but not limited to, a motor or a gear device.

In the present context the terms "in-feed structure", "loading structure" and "loading unit" refer to an in-feeding mechanism which loads the first winding of one or more channels of a drum unit with food items in liquid and optionally air or gas.

In the present context the terms "outfeed structure", "collecting structure" and "outfeed collecting structure" refer to an out-feeding mechanism which receives items in liquid from the last winding of a channel of the drum and delivers the items either separately or in the liquid out of the apparatus and optionally separates the air/gas phase from the food items and the liquid.

In the present context the term "sequentially and repeatedly" in reference to feeding the apparatus of the present invention refers to feeding each channel in a multi-channel second heat exchange unit of the apparatus with food items in liquid and an air phase during rotation of the channels. After having fed food items in liquid and air phase to all channels of the two or more channels with food items in liquid and the channels have been rotated one full rotation, feeding of food items in liquid is continued into the two or more channels as long as there are food items in liquid to be fed into the apparatus.

In the present context the term "drum unit" refers to a rotating structure with one or more channels formed in the structure to treating food items in liquid including heat exchange through the liquid in the drum unit.

In the present context the term "first heat exchange medium" refers to a temperature controlled medium/liquid which is circulated into a chamber of a first heat exchange unit to facilitate heat exchange through an outer surface of a second heat exchange unit located within the chamber of a first heat exchange unit. The temperature of the first heat exchange medium can be regulated by circulating the first heat exchange medium through a heat exchange device connected to the chamber. The first heat exchange medium is not in direct contact with the food items being heated, cooled transported and/or treated in liquid in the second heat exchange unit located within the chamber of a first heat exchange unit.

In the present context the term "second heat exchange medium" refers to a temperature-controlled liquid used for transporting and treating food items in liquid in a second heat exchange unit located within the chamber of a first heat exchange unit. The second heat exchange medium is in direct contact with the food items the liquid used for transporting the food items through the drum unit of the second heat exchange unit is the second heat exchange medium. The term "second heat exchange medium" is therefore refers to the liquid used for heating, cooling, transporting and/or treating food in liquid.

In the present context the term "Sub-Chilling™" or "under-cooling" refer to the process or method of bringing fish to a desired temperature at or near the phase transition of freezing the fish without freezing the fish, and generally below the freezing point of water (0° C.). Furthermore, these terms refer to a fish or fish product being brought to or kept at a desired temperature at or near the phase transition of freezing the fish without freezing the fish, such as a temperature below 0° C. (sub-zero conditions).

In the present context the terms "solution", "salt solution", "salt-controlled" and "temperature-controlled solution" when referring to Sub-Chilling™, all refer to a solution where the salt concentration of a cooling solution is adjusted and set to determine a freezing point of the solution, thereby keeping the temperature of the solution substantially constant at a temperature which is higher than the freezing point of the solution. The temperature of this solution is determined each time with respect to the one or more of density of the food items being brought to an undercooled state, type of animal or food items, fat percentage, and time of the process step.

In the present context the terms "positive radial bend" or "forward radial bend" relate to a bend in the spiral shaped blade where the pointing direction of the angle caused by the bend is in the forward moving direction of the blade, i.e. in the direction of which the objects are transferred using the spiral shaped blade.

In the present context the terms "negative radial bend" or "backwards radial bend" relate to a bend in the spiral shaped blade where the pointing direction of the angle caused by the bend is in the backwards moving direction of the blade, i.e. in the opposite direction of which the objects are transferred using the spiral shaped blade.

In the present context the term "sector" refers to the surface of the blade between every positive and negative radial bend in the blade. For definition purposes each sector is defined as being a portion of a 360° rotation of the screw blade. Therefore, when a 360° rotation of the blade is divided into 8 functional units of 45° between two positive or negative radial bends, each functional unit has two sectors where one is directed in the negative advancing direction of the blade, thereby creating a backwards push of the material resting against that sector and the other sector is directed in the positive advancing direction of the blade and thereby creating a forward advancement of the material resting against that sector. The size of the two sectors of the 45° functional unit of the blade may be of the same or different size where a large sector directed in the negative advancing direction of the blade pushes the items far back and creates a harder treatment of the items compared to a smaller sector directed in the negative advancing direction of the blade pushes the gently back and creates a softer treatment of the items in the conveyor.

The First Heat Exchange Unit

In an embodiment of the present invention the chamber of the first heat exchange unit is an open tub like container.

In an embodiment of the present invention the chamber of the first heat exchange unit is a closed container.

In an embodiment of the present invention the first heat exchange unit is a container containing heat exchange medium, and the one or more spiral-shaped channels of second heat exchange unit are at least partially submerged in the first heat exchange medium of the chamber of the first heat exchange unit, and wherein the liquid used for transporting the food items through the one or more spiral-shaped channels of second heat exchange unit of the second heat exchange unit is the second heat exchange medium.

In an embodiment of the present invention the first heat exchange unit is a chamber wherein the chamber further comprises means for blowing temperature regulated air onto the one or more spiral-shaped channels of second heat exchange unit.

In an embodiment of the present invention the first heat exchange unit is a chamber containing liquid first heat exchange medium, and the lower part of the one or more spiral-shaped channels of second heat exchange unit is submerged in the first heat exchange medium of the chamber of the first heat exchange unit, and wherein the chamber further comprises means for blowing temperature regulated air onto the upper part of the one or more spiral-shaped channels of second heat exchange unit.

In an embodiment of the present invention the first heat exchange unit is a liquid container containing cooling media for contributing to a heat exchange process or for facilitating a heat exchange treatment of the food items in the one or more spiral-shaped channels of second heat exchange unit.

In an embodiment of the present invention the one or more spiral-shaped channels of the second heat exchange unit are fully submerged in the heat exchange medium in the container of the heat exchange unit.

In an embodiment of the present invention the one or more spiral-shaped channels of the second heat exchange unit are rotatably arranged around a substantially horizontal axis for operating according to the principle of Archimedes.

In an embodiment of the present invention the one or more spiral-shaped channels are divided into windings and wherein each winding contains about 50% food items in liquid and the remaining volume in each winding is an air phase.

In an embodiment of the present invention the ratio of liquid and food items vs air phase in each channel of the second heat exchange unit is about 50/50, such as such as 49/51, or 48/52, 45/55, or 40/60.

In an embodiment of the present invention the volume capacity for each in-feed pipe for food items and liquid media in a 360° rotation of the two or more spiral shaped channels equals the about 50% of the volume of a one winding, such as 49% to 51%, or 48% to 52%, or 40% to 60%.

In an embodiment of the present invention, each spiral-shaped channel of the second heat exchange unit has three to fifty windings, such as three to twenty-five windings or three to ten windings. The thickness of the tubing is determined by the amount of food items to be treated and the speed of treatment in each winding of the pump.

In an embodiment of the present invention the one or more spiral-shaped channels of second heat exchange unit are made from hose or pipe like flexible material. In such an embodiment, the hose or pipe like flexible material is wound around or in a horizontally rotating frame/support structure, wherein the tubing is formed in a spiral in connection with rotating frame/support structure.

In some embodiments the tubing of the pumping device is arranged to thread the in-feed end through the centre space of the windings to exit by the last winding of the pumping device and the out-feed end is threaded through the centre space of the windings to exit by the first winding of the pumping device.

In an embodiment of the present invention the one or more spiral-shaped channels of second heat exchange unit are made from metal, such as steel.

In an embodiment of the present invention the channels the one or more spiral-shaped channels of second heat exchange unit are the load bearing structure of the second heat exchange unit.

In an embodiment of the present invention the one or more spiral-shaped channels of second heat exchange unit are formed as a drum unit.

In an embodiment of the present invention the one or more channels of the drum unit are formed around a hollow core extending along the hollow core.

In an embodiment of the present invention the one or more channels of the drum unit are formed as helical shaped channels around the hollow core.

In an embodiment of the present invention the drum unit comprises two or more parallel arranged helical shaped channels with a common in-feed and an out-feed structure for the two or more parallel arranged helical shaped channels.

In an embodiment of the present invention each of the one or more parallel arranged helical shaped channels of the drum unit is formed by i) core plates, ii) opposite wall plates, and iii) an outer drum wall.

In an embodiment of the present invention the core plates of the drum unit are designed to extend into the cavity of the channel forming a structural hinderance in the channel.

In an embodiment of the present invention the opposite side plates of the drum unit are helically arranged around a core structure, perpendicular to the core plates.

In an embodiment of the present invention the helically arranged opposite side plates of the drum unit have alternating positive and negative radial bends along the length of the spiral helically arranged side plates.

In an embodiment of the present invention the outer drum wall forms the outer surface of each of the one or more parallel arranged helical shaped channels and the outer surface of the drum unit of second heat exchange unit.

In an embodiment of the present invention the spiral-shaped channel is formed by one or more spiral shaped blades mounted around a hollow core.

In an embodiment of the present invention the hollow core is filled with air, and wherein the air phase in the hollow core as a load bearing function for the drum unit in the chamber of the first heat exchange unit.

In an embodiment of the present invention the spiral-shaped channel is closed by an outer surface around the spiral shaped blade forming the channel between adjacent blade walls in the spiral or helical wound blade around the core.

In an embodiment of the present invention the hollow core forms a rotation axis and wherein the spiral-shaped channel advances the food items in liquid from one end of the spiral shaped channel to the other upon rotation of the spiral shaped channel.

In an embodiment of the present invention the spiral blade has alternating positive and negative radial bends along the length of the spiral blade.

In an embodiment of the present invention the alternating positive and negative radial bends along the length of the spiral blade divide the blade into sectors.

In an embodiment of the present invention the sector behind a positive bend is of the same size or of a different size as the sector behind negative bend.

In an embodiment of the present invention the size of a sector is defined as part of a 360° circle of the spiral shaped blade.

In an embodiment of the present invention the alternating positive and negative radial bends along the length of the spiral blade are parallel in each position of the blade, where the positions are defined as positions in a 360° circle of the spiral shaped blade.

In an embodiment of the present invention the drum of the second heat exchange unit is formed by one or more spiral shaped channels and wherein each spiral-shaped channel is formed by i) an inner wall at least partially forming a hollow core, two adjacently arranged spiral shaped walls substantially perpendicularly and helically mounted around the hollow core, and iii) an outer wall arranged around the two adjacently arranged spiral shaped walls forming the channel between adjacent spiral shaped walls and the core.

In an embodiment of the present invention the said hollow core forms a rotation axis and wherein the spiral-shaped channel advances the food items in liquid from one end of the spiral shaped channel to the other upon rotation of the spiral shaped channel.

In an embodiment of the present invention one or more of i) the inner wall, ii) the at least two adjacently arranged spiral shaped walls, and iii) the outer wall have structural features, such as bends and extensions in and out of each channel for altering the circumference of the channel along the length of the channel and to create obstacles or hinderance to facilitate movement or tumbling of the food items as the food items are advanced through the channel by the rotation of the drum unit.

In an embodiment of the present invention structural hinderance provided by part of core plates in the drum unit extending into the cavity of each channel create alternating diameter of the channel and provide tumbling and moving of the food items passing through each channel.

In an embodiment of the present invention the diameter of the tubing is narrowed and widened alternatively through the winding to alternate the speed of flow in the apparatus.

Therein, the diameter of each channel is narrowed and widened alternatively through each winding to alternate the speed of flow of liquid in the apparatus.

In an embodiment of the present invention the apparatus comprises two or more parallel arranged spiral-shaped channels having a common in-feed- and out-feed structure.

In an embodiment of the present invention the second heat exchange unit is rotatable around a substantially horizontal axis.

In an embodiment of the present invention the means for rotating the first heat exchange unit is a motor.

In an embodiment of the present invention the motor is positioned outside the chamber of the first heat exchange unit.

In an embodiment of the present invention a control means controls the motor and the motor rotates the second heat exchange unit.

In an embodiment of the present invention the second heat exchange unit is rotated a full cycle between feeding food items in liquid into each of the one or more channels of the second heat exchange unit.

In an embodiment of the present invention each of the one or more channels of the second heat exchange unit is fed once with food items in liquid during each full cycle of rotation of the second heat exchange unit.

In an embodiment of the present invention the control means alters the speed of the rotation at least once during every full cycle rotation.

In an embodiment of the present invention the speed of rotation is altered at least once for the number of spiral shaped channels in a multi-channel second heat exchange unit.

In an embodiment of the present invention the speed of rotation is altered two times or more for each spiral shaped channel in a multi-channel second heat exchange unit.

In an embodiment of the present invention a portion of the in-feed end and the out-feed end or a portion of the in-feed structure and the out-feed structure extend through the walls of the chamber of the first heat exchange unit.

In an embodiment of the present invention the in-feed structure is designed to serially and continuously feed each of the channels in the second heat exchange unit with air-phase, liquid and food items during a full rotation of the second heat exchange unit.

In an embodiment of the present invention the apparatus further comprises a loading unit connected to the in-feed structure of the second heat exchange unit for loading the first winding of each of the one or more spiral-shaped channels of the second heat exchange unit with food items in liquid.

In an embodiment of the present invention the loading unit further comprises means for feeding air or gas into the first winding of the spiral-shaped channels of the second heat exchange unit.

In an embodiment of the present invention the loading structure/unit further comprises means for controlling the amount of food items in liquid and air/gas into the first winding of the spiral-shaped channel.

In an embodiment of the present invention the loading device comprises a separate opening and in-feed pipes for connection to the in-feed end of each of a two or more spiral shaped channels in a multi-channel second heat exchange unit, for sequentially and repeatedly loading each first winding of the two or more spiral shaped channels with food items in liquid media and air phase.

In an embodiment of the present invention the in-feed pipes of the loading device are curved and rotate eccentrically to the central axis of the two or more spiral shaped channels, such that the shape of an in-feed pipe and the water level in the in-feed structure generates i) an air-lock when the feeding pipe is no longer able to deliver liquid into the first winding at the end of loading a winding, and ii) a water-lock when the feeding pipe no longer able to provide a free flow of air into the first winding during loading the upper portion of a winding with air phase.

In an embodiment of the present invention the apparatus further comprises means for monitoring and regulating the re-directed flow or the air phase from the out-feed structure back to the loading device. This allows continuous adjustment of the water level in the in-feed and the out-feed structure so that each first winding of the plurality of channels in the apparatus are feed with a desired ratio of food items in liquid media and air phase.

In an embodiment of the present invention the means for monitoring and regulating the re-directed flow or the air phase from the out-feed structure back to the loading device further comprises means for detecting the water level/in the loading device and in the out-feed structure comprises a pipe or hose and a sensor between the upper and lower part of the loading device and the out-feed structure.

In an embodiment of the present invention the means for monitoring and regulating the re-directed flow or the air phase from the out-feed structure back to the loading device further comprises a water level sensor associated with the outer collecting portion of the loading device and the out-feed structure.

In an embodiment of the present invention the out-feed structure further comprises a separate opening and out-feed pipes for connection to the out-feed end of each of the two or more spiral shaped channels in a multi-channel second heat exchange unit, for sequentially and repeatedly exiting food items in liquid media and air phase from each last winding of the two or more spiral shaped channels.

In an embodiment of the present invention the apparatus further comprises an out-feed collecting structure for collecting the food items in liquid from the last winding of each of the one or more spiral-shaped channels of the second heat exchange unit.

In an embodiment of the present invention the outfeed collecting structure further comprises means for separating the food items from the liquid and/or the air/gas phase and means for separately evacuating the food items, the liquid and/or the air/gas from the outfeed collecting structure.

In an embodiment of the present invention the in-feed structure and the out-feed structure feed food items in liquid sequentially and continuously into and out of each of the one or more channels of the second heat exchange unit of the second heat exchange unit.

In an embodiment of the present invention the food items from each winding of each of the one or more channels of the drum unit are separated from the liquid and the air-phase in the or after the out-feed structure of the second heat exchange unit. In such an embodiment the liquid can be redirected to an in-feed structure of the present or other apparatus for heating or cooling food items with or without filtering the liquid during the redirection step.

In an embodiment of the present invention the first heat exchange unit is a container containing heat exchange medium, and the second heat exchange unit is at least partially submerged in the first heat exchange medium of the chamber of the first heat exchange unit, and wherein the liquid used for transporting the food items through the second heat exchange unit is the second heat exchange medium.

In an embodiment of the present invention the second heat exchange medium for contributes to heating or cooling food items and wherein the temperature of the second heat exchange medium is regulated by the temperature of the first heat exchange medium through the outer surface of the second heat exchange unit subjected to the first heat exchange medium in the drum of the first heat exchange unit.

In an embodiment of the present invention the food items are subjected to heat exchange both from the liquid in the second heat exchange unit and from the surface of the channel of the second heat exchange unit.

In an embodiment of the present invention two or more apparatuses for heating or cooling food items in liquid are serially connected to provide separate or stepwise treatment in separate apparatuses.

In an embodiment of the present invention the first heat exchange medium is glycol for cooling food items in the liquid of the drum and wherein the liquid in the drum is the second heat exchange medium.

In an embodiment of the present invention the first and/or the second heat exchange medium or the liquid for transporting the food items through the second heat exchange unit is a salt-controlled and temperature-controlled solution.

In an embodiment of the present invention the second heat exchange medium or the liquid for transporting the food items through the second heat exchange unit is a salt-controlled and temperature-controlled solution or water or a salt-free solution with or without other additives.

In an embodiment of the present invention the apparatus further comprises an air/gas-duct for re-directing the air/gas is back to the loading structure.

In an embodiment of the present invention the liquid and the air-phase are redirected from the out-feed structure of the second heat exchange unit back to the in-feed structure of the apparatus for heating or cooling food items for reuse.

In an embodiment of the present invention the apparatus further comprises piping for re-directing the liquid from the out-feed structure back to the loading structure.

In an embodiment of the present invention the piping further comprises a heat exchange device to regulate the temperature of the liquid being re-directed to the loading structure.

In an embodiment of the present invention the piping further comprises a filter device to filter the liquid being re-directed to the loading structure.

In an embodiment of the present invention the piping further comprises a circulation pump for re-directing the liquid from the out-feed device back to the loading structure.

In an embodiment of the present invention two or more apparatuses for heating or cooling food items in liquid are serially connected to provide separate or stepwise treatment in separate apparatuses.

In an embodiment of the present invention the liquid and the air-phase are either separated from the food items before they are transferred into the next apparatus for heating or cooling food items in liquid or the food items together with the liquid and the air phase are transferred into the next apparatus for heating or cooling food items in liquid. In such embodiments the air-phase and the liquid may be infused with new liquid or air-phase respectively for adjustment of composition of the liquid and air-phase for the treatment in the apparatus for heating or cooling food items.

In an embodiment of the present invention two or more apparatuses for heating or cooling food items in liquid are serially connected for separate treatment steps or gradual or stepwise treatment of food items in liquid including heating or cooling the food items in liquid through the treatment process.

In an embodiment of the present invention the one or more of the two or more apparatuses for heating or cooling food items in liquid are placed in separate rooms or areas of a processing facility.

In an embodiment of the present invention the one or more of the two or more apparatuses for heating or cooling food items in liquid are placed partially or fully outside a processing facility, wherein the in-feeding and out-feeding structure opens into the processing facility.

In an embodiment of the present invention three or more apparatuses for heating or cooling food items in liquid are serially connected and wherein the liquid used for heating or cooling the food items in the drum of the second heat exchange unit of the one or more of the second and further apparatuses for heating or cooling food items in liquid is re-used for the heating or cooling the food items in the drum of the apparatus, and wherein fresh liquid is introduced into the system for the second and further apparatuses for heating or cooling food items in liquid.

In an embodiment of the present invention fish is pumped from a reservoir tank onboard a vessel to a first container for on shore in RSW, and thereafter the fish is transported to storage or further processing in the RSW before the RSW is returned back to the reservoir tank onboard a vessel for pumping more fish to shore.

In an embodiment of the present invention food items such as fish are brought to an undercooled state using "Sub-Chilling" in the apparatus for heating or cooling food items in liquid.

In an embodiment of the present invention bringing the food items to an undercooled state is performed in a salt-controlled and temperature-controlled solution in at least one steps of placing the food items in a salt-controlled and temperature controlled solution having a salt concentration in the range from 0.1 to 20% and a temperature in the range from +1 to −12° C., where the salt concentration and set temperatures of the salt-controlled and temperature controlled solution brings the homogenous temperature of the food items to +2 to −5° C.

In an embodiment of the present invention using the apparatus for heating or cooling food items in liquid further comprises treating the food items with a process for reducing risk of or slowing the growth of microorganisms, such as bacteria, where the bacteria are selected from, but not limited to salmonella, listeria, *E. coli*, etc. In such an embodiment, the process for reducing risk of or slowing the growth of microorganisms comprises treating the food items in a sterilization step.

In an embodiment of the present invention treating the food items in a sterilization step comprises chemical sterilization. Furthermore, the step of treating the food items with anti-bacterial treatment comprises treatment of the food items with substances known for the type of bacteria commonly contaminating the food items being processed. In some embodiments the anti-bacterial treatment comprises using anti-bacterial agents selected from, but not limited to, chlorine, salts, polyphosphates, ozone or any combination thereof.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 11:
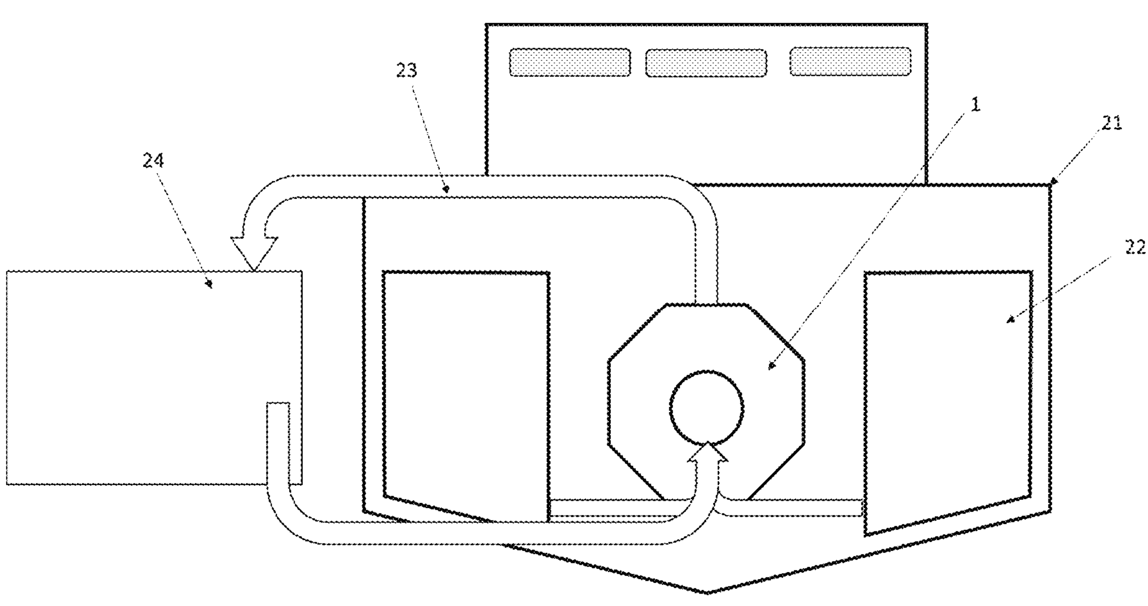

FIG. 11 outlines transportation of RSW and fish in RSW to and from a fishing vessel.

Figure 12:
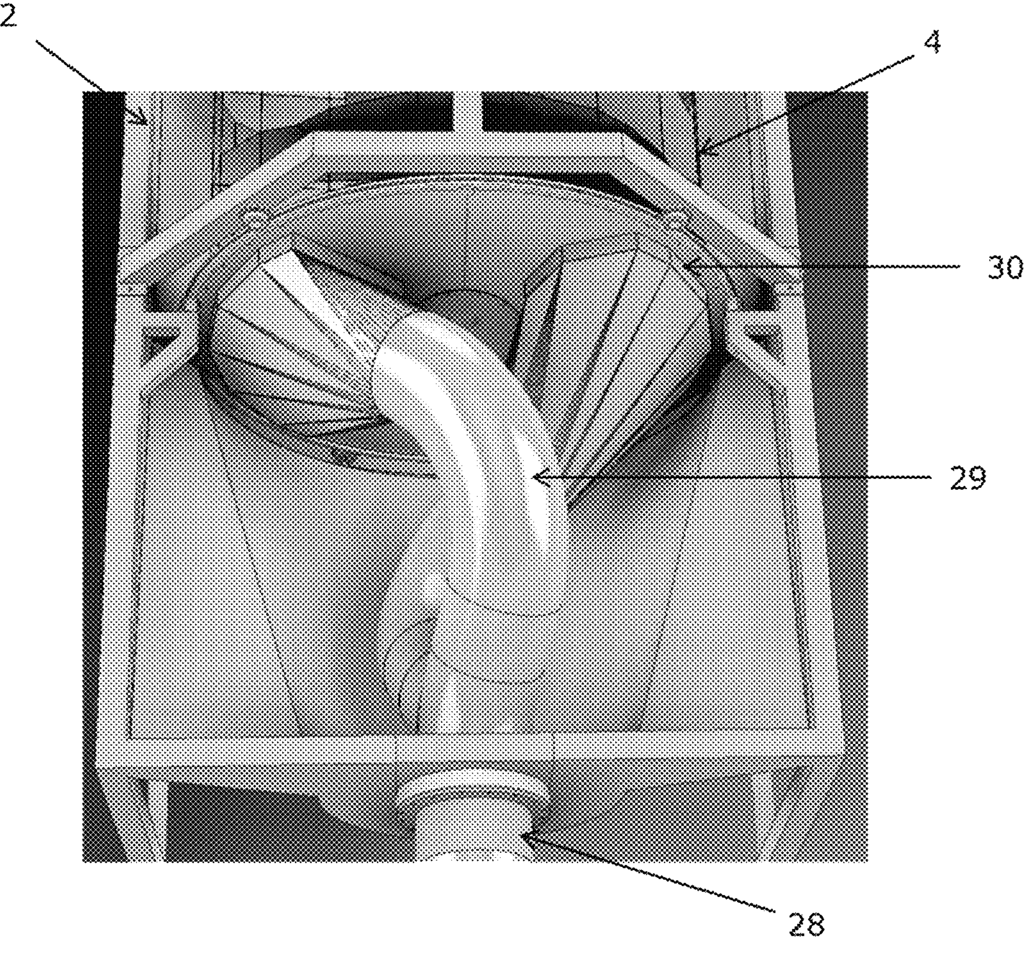

FIG. 12 shows an in-feed structure according to one embodiment of the invention.

Figure 1:
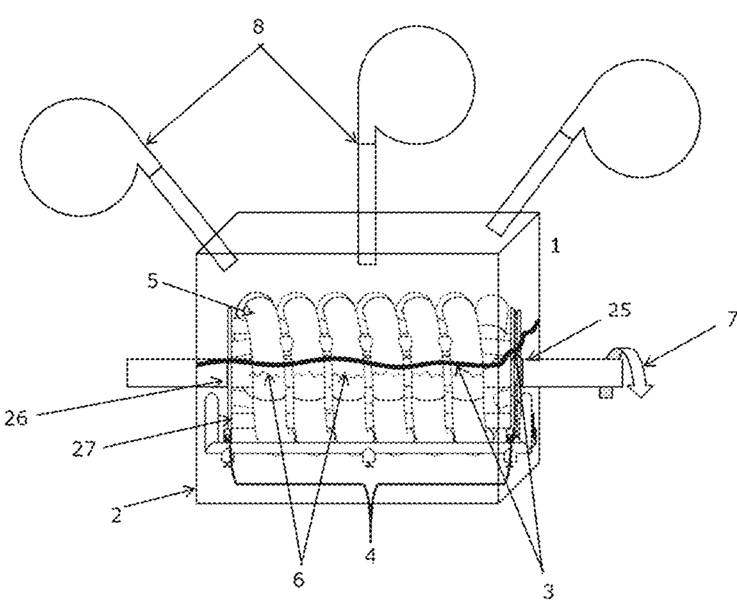
FIG. 1 is a front view of a spiral shaped channel in a heat exchange chamber.

The present invention will become more fully understood from the detailed description given hereinafter and the accompanying drawings which are given by way of illustration only, and thus, are not limitative of the present invention, and wherein:

FIG. 1 shows an apparatus according to an embodiment of the present invention, where the apparatus for transferring and/or treating food items in liquid is a pumping device operating according to the principle of Archimedes. The apparatus 1 comprises a second heat exchange unit 4 in the form of a spiral shaped channel 5 having an in-feed end 25 and an out-feed end 26 with six windings. In the embodiment shown in FIG. 1, the spiral-shaped channel 5 is rotated by a drive means 7 such as a motor positioned outside the chamber 2. Furthermore, the in-feed end 25 and the out-feed 26 end extend through the walls of the chamber 2. The first heat exchange unit 2 shown in FIG. 1 is a closed chamber 2 with fan devices 8 for blowing chilled air onto the upper portion of the spiral-shaped channel 5. The channel is also partially submerged in cooling liquid medium 3 for providing heat exchange to the food items in liquid in the second heat exchange unit 4. The liquid for treating the food items is the second heat exchange medium 6 (shown with a dotted line to indicate being inside the channel).

Figure 2:
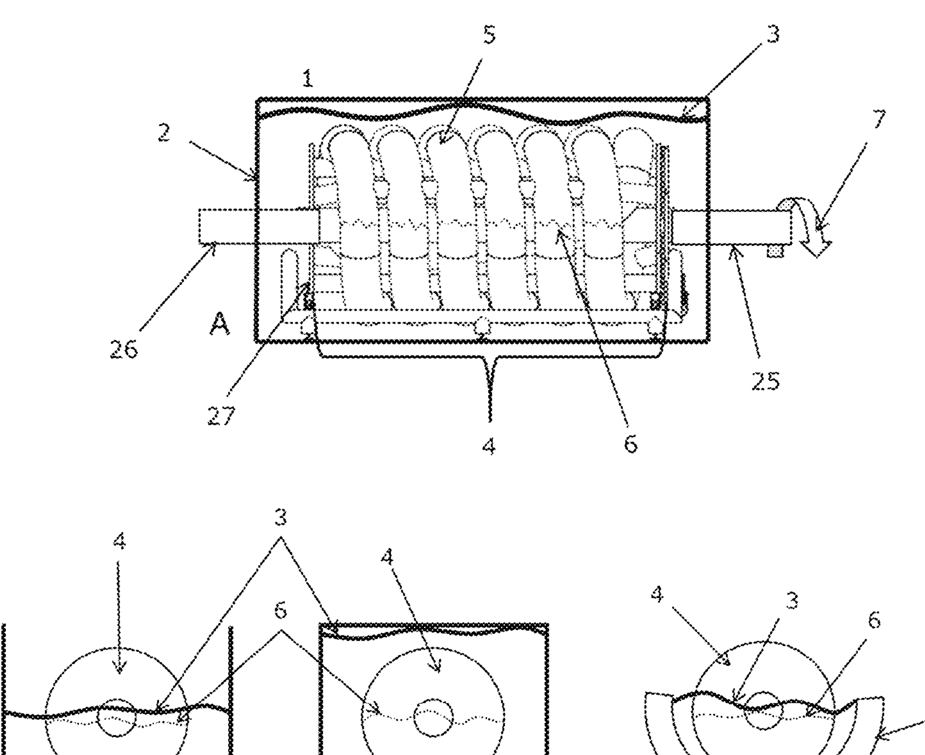
FIG. 2 is a drawing of a second heat exchange unit in a first heat exchange unit.

FIG. 2 shows an apparatus according to an embodiment of the present invention, where the apparatus is a channel device in a chamber as described in FIG. 1. In this embodiment the second heat exchange unit 4 is fully submerged in the heat exchange medium 3 in the chamber 2 of the first heat exchange unit 2. FIG. 2A shows a side view of the apparatus where the spiral shaped channel 5 wound around a frame structure 27. In this embodiment the in-feed end 25 and the out-feed end 26 extend through the walls of the chamber 2 and the spiral-shaped channel is rotated by a drive means 7 such as a motor positioned outside the chamber 2. FIG. 2 B-D show a transection of drum unit, being the second heat exchange unit 4 in first heat exchange units 2. In FIG. 2B the drum unit 4 is partially submerged in a first heat exchange medium 3 in a liquid container 2 with an open upper surface. In FIG. 2C the first heat exchange units is a closed chamber 2, where the drum unit 4 is fully submerged in a first heat exchange medium 3 and in FIG. 2D the drum unit 4 is partially submerged in a first heat exchange medium 3 in a liquid container 2 with a semi-circular cross section and an open upper surface. The liquid for treating the food items is the second heat exchange medium 6 (shown with a dotted line to indicate being inside the channel).

Figure 3:
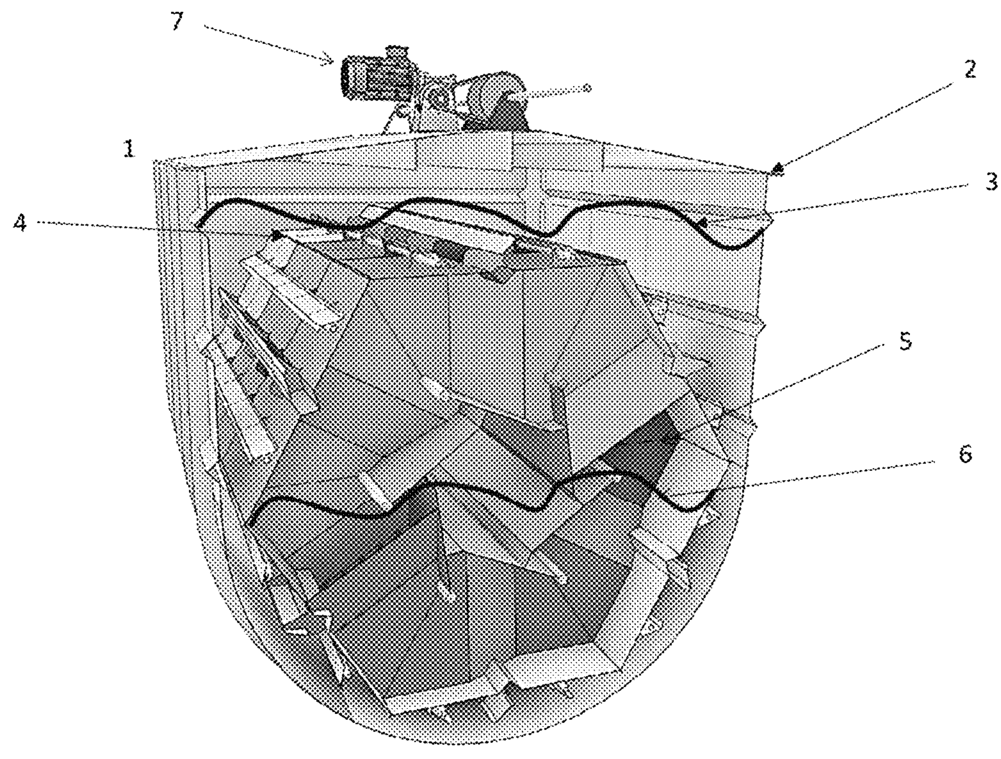
FIG. 3 is a front transection view of an apparatus according to one embodiment of the present invention indicating the main parts of the apparatus of the invention.

FIG. 3 shows an apparatus according to an embodiment of the present invention, where the apparatus for cooling or heating food items in liquid is a device operating according to the principle of Archimedes. The apparatus 1 shown in FIG. 3 comprises a chamber 2 of a first heat exchange unit 4, where the chamber 2 of the first heat exchange unit is designed for holding first heat exchange medium 3. A second heat exchange unit 4 is arranged within the chamber of the heat exchange unit. The second heat exchange unit is designed as a drum unit 4 having ducts/channels 5 for transmitting/transporting food items in liquid 6 through. The liquid used for transporting the food items through the drum unit is defined as the second heat exchange medium 6 and is temperature regulated through the outer surface of the drum unit 4 and the first heat exchange medium 3 surrounding the drum unit 4. In the embodiment shown in FIG. 3, the drum unit is fully submerged in the first heat exchange medium, and the drum unit is rotated around an axis by a motor 7 outside of the chamber of the first heat exchange unit.

Figure 4:
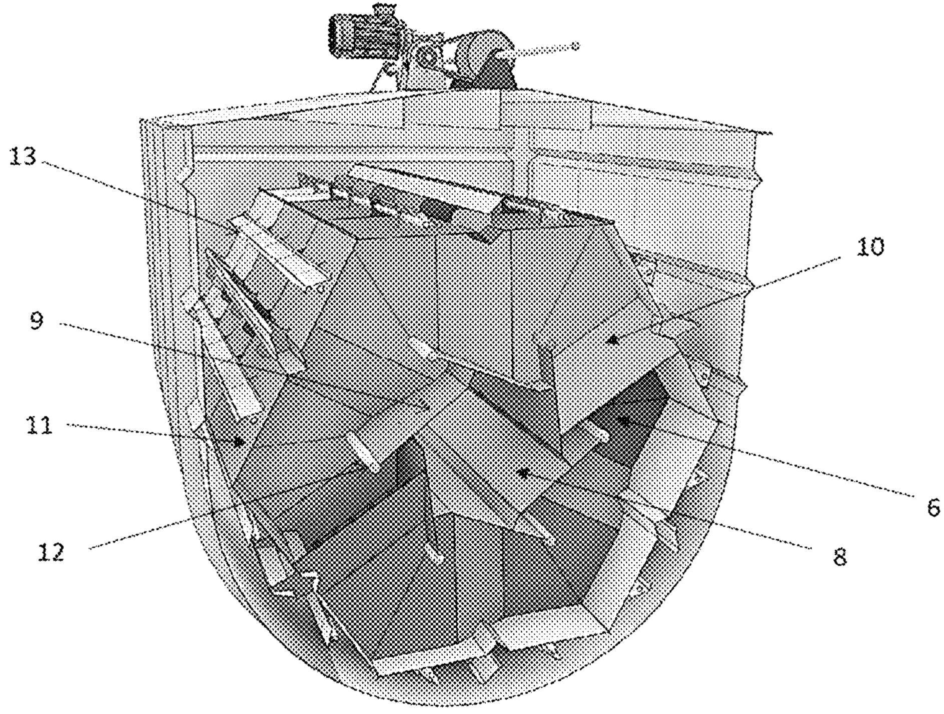
FIG. 4 is a front transection view as shown in FIG. 1 outlining the components of the second heat exchange unit.

FIG. 4 outlines the building components of the drum unit 4 of the first heat exchange unit. The channels 6 are formed around a hollow core 8 extending along the rotating axis of the drum unit 4. Each channels is formed by core plates 9, opposite wall plates 10 and an outer drum wall 11 forming the exterior of the drum unit 4. In the embodiment shown in FIG. 4 the core plates extend towards axial pins 12 to form structural hinderance in the channel for the food items as they pass through the channel. These structural hinderances provide an alternating diameter of the channel which affects the flow of the liquid in the channel as well as cause the food items to tumble around in the channel increasing the effect of the heat exchange process. Stirring blades 13 are arranged on the outside of the drum unit 4 to stir the first heat exchange medium in the chamber and maintain the same temperature in the whole chamber. The side wall plates in the embodiment shown in FIG. 4 are helically arranged around the core of the drum being perpendicular to the core plates. As the opposite side plates are helically wound around the core of the drum the form a spiral shaped channel along the length of the drum unit.

Figure 5:
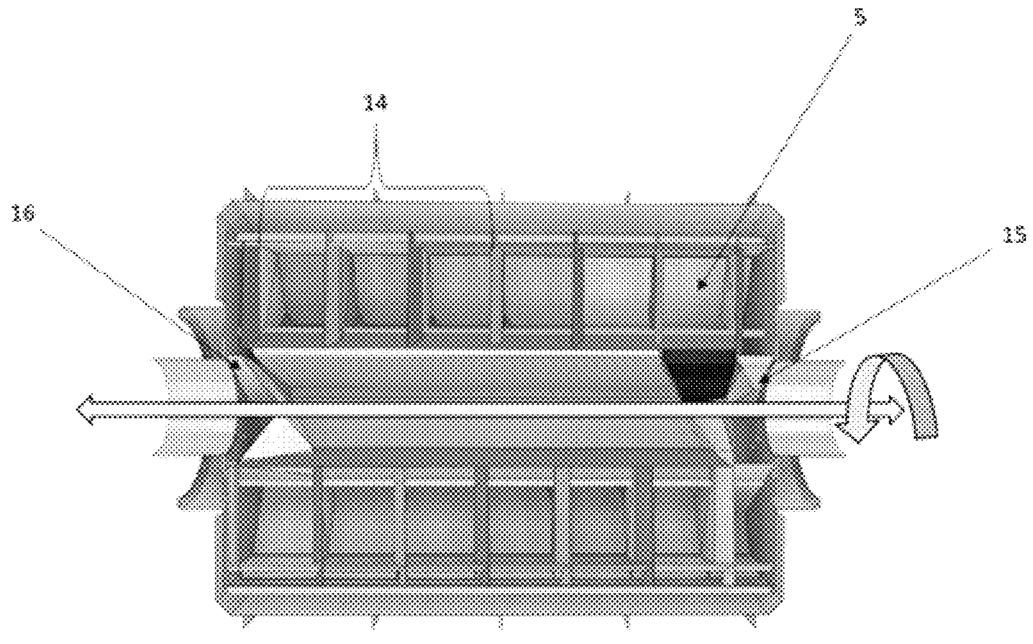
FIG. 5 is a transactional side view of the drum unit of the second heat exchange unit.

FIG. 5 is a transactional side view along the centre of the drum unit 4. The drum 4 is rotated around an axis indicated with arrows. Each of the one or more channels 5 forms windings 14 along the length of the drum from the in-feed end to the out-feed end. As the drum can be rotated in both directions the arrow indicating the axis is shown pointing in opposite directions. The in-feed structure 15 and the out-feed structure 16 are designed to feed food items in liquid into each of the one or more channels of the drum unit.

Figure 6:
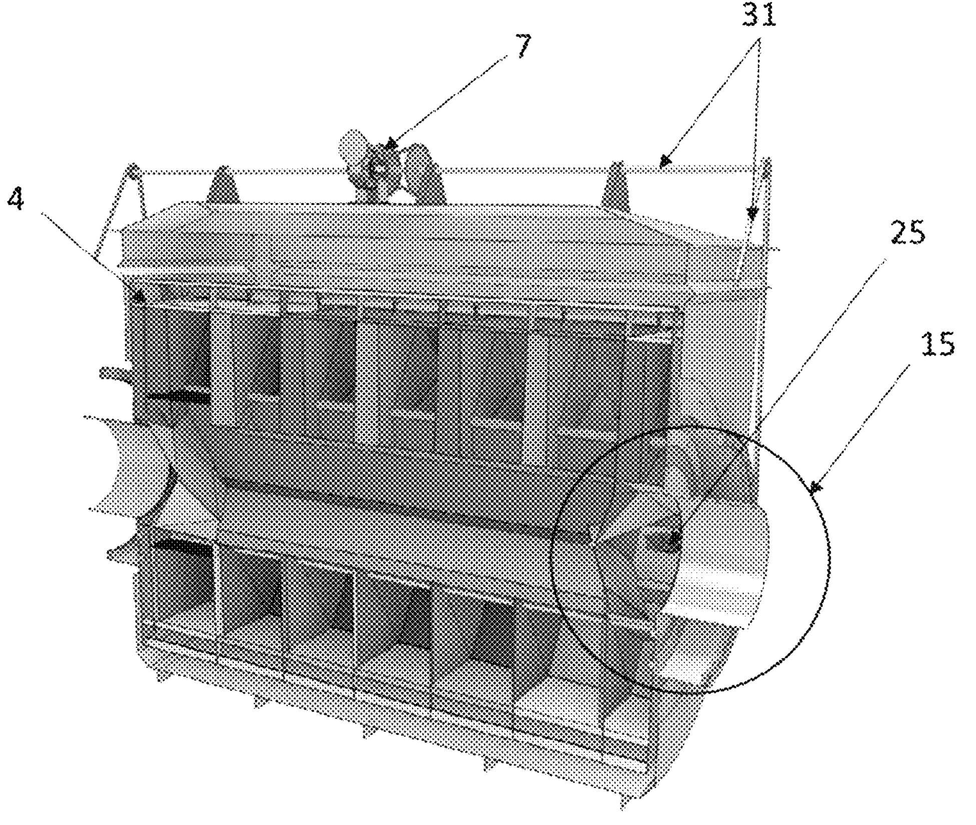
FIG. 6 is a perspective transactional side view of the apparatus of the invention.

FIG. 6 shows certain parts of an in-feed structure 15 for the drum unit of the device. In addition to an inlet opening, the in-feed structure may comprise means for directing food items 25 into different channels of the drum unit as well as means for blending food items and liquid and controlling the amount of food items, liquid and air-phase onto each winding. The drawing also shows the motor 7 and drive means 31 for rotating the drum unit 4.

Figure 7:
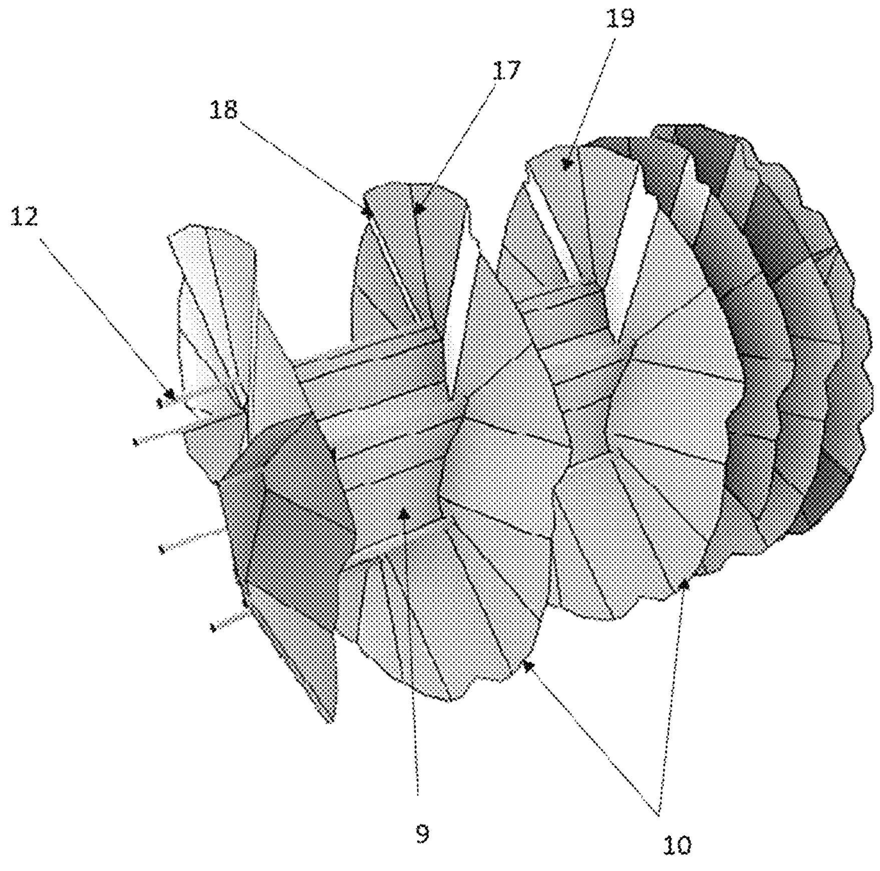
FIG. 7 is a perspective drawing of the drum unit without the outer drum wall showing how the channels are formed.

FIG. 7 shows how the channels are formed according to one embodiment of the present invention. Each channel is formed by opposite wall plates 10 where each wall plate is a helically arranged blade around the core of the drum unit. The helical blade 10 is perpendicular to the core plates 9 extending from the in-feed end to the out-feed end of the drum unit. The drawing shows the axial pins 12, which serve a purpose in the assembly of the drum unit. The core plates 9 are attached to the axial pins 12 and the helical blade 10 forms a spiral along the length of the core. In the embodiment shown in FIG. 7, Each blade forming the wall plates 10 has alternating positive 17 and negative 18 radial bends along the length of the spiral blade, where the area between each positive radial bend can be defined as a sector 19.

Figure 8:
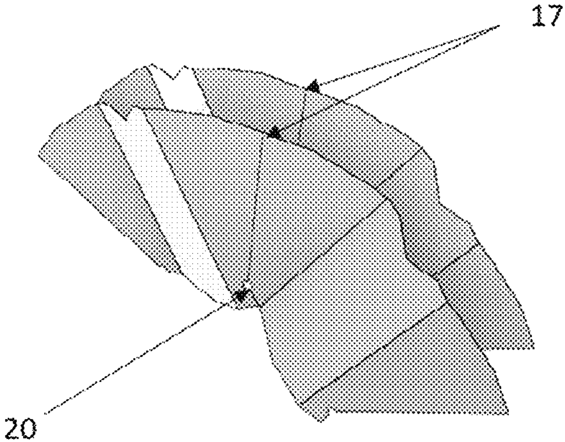
FIG. 8 is a perspective view of a portion of a spiral shaped blade for forming a side wall in one of the channels of the drum unit.

FIG. 8 shows a section of two parallel blades according to the embodiment shown in FIG. 7. The drawing demonstrates how the wall plate blades are parallel arranged and the alternating positive 17 and negative 18 radial bends are parallel along the length of the drum unit. The drawing also shows holes 20 in the components making up the blade as the blades are mounted on the axial pins during assembly.

Figure 9:
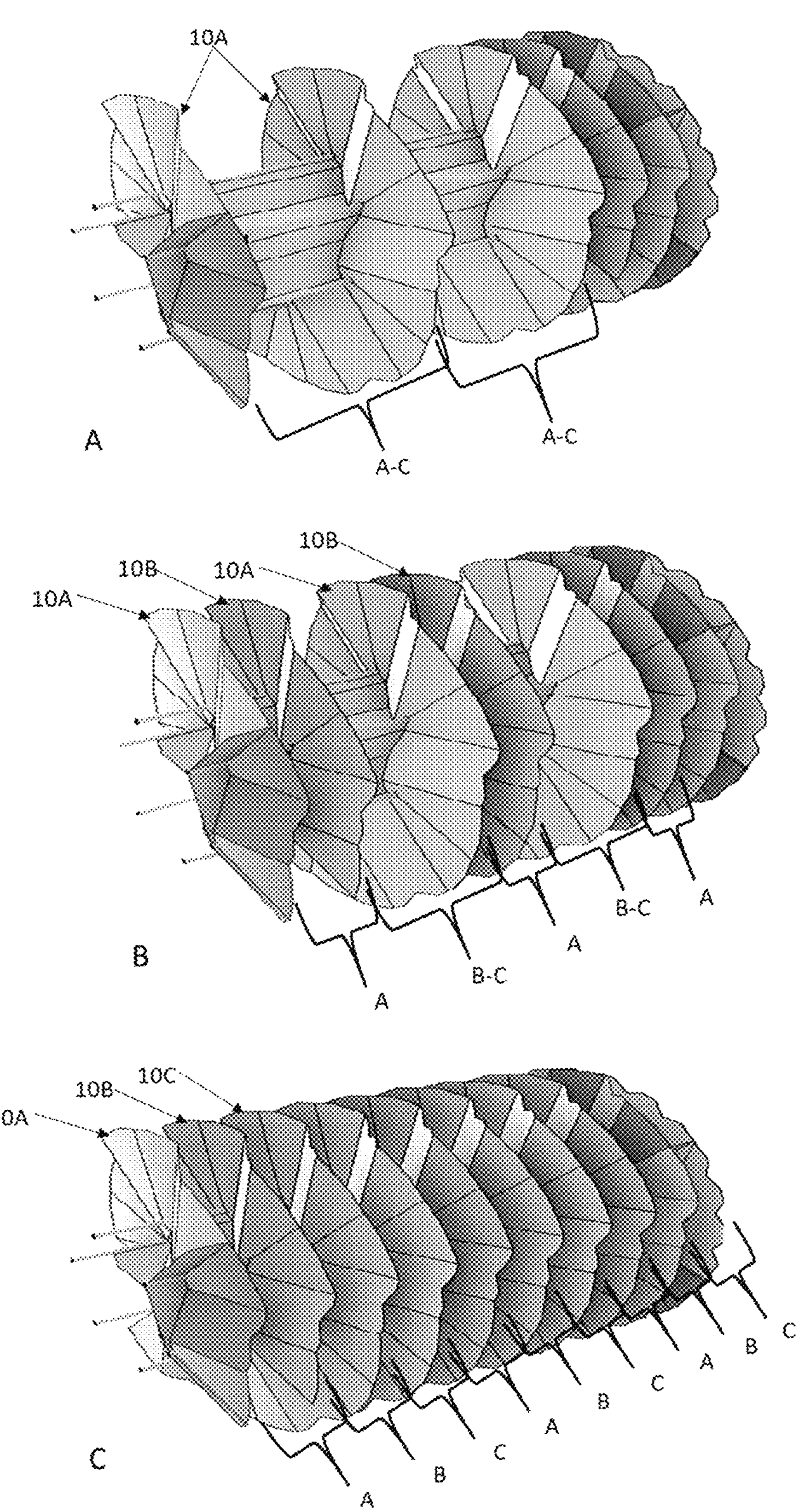
FIG. 9 is a perspective view of a forming side walls in a drum with three channels.

FIG. 9 demonstrates how helical blades 10 can be arranged to make up three parallel channels (A-C) along the length of the drum. FIG. 9A shows a first blade 10A defining the area for cannels A, B and C. In FIG. 9B a second blade 10B has been added to provide the opposite wall plates for channel A and define the area for channels B and C. In FIG. 9C, the third blade 10C has been added to provide the opposite wall plates for channels B and C.

Figure 10:
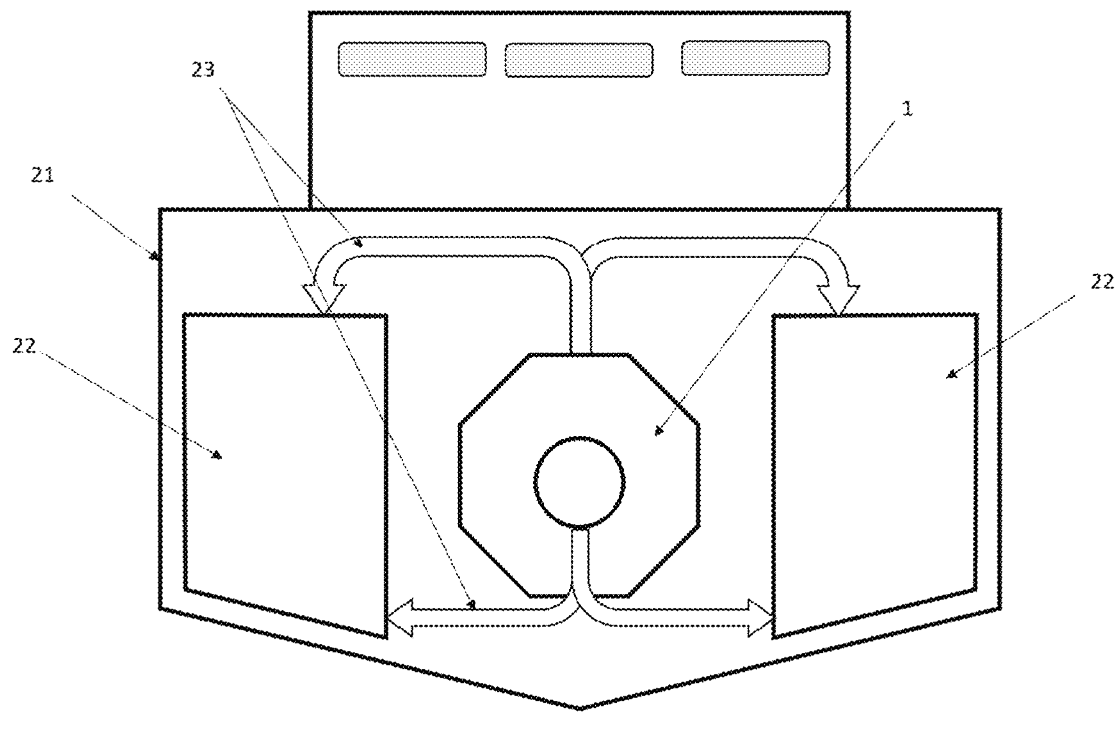
FIG. 10 is a transactional view of a an RSW system in a fishing vessel.

FIG. 10 demonstrates the use of an apparatus of the present invention to use for temperature management in a fishing vessel with RSW tanks. The vessel 21 has a plurality of storage and transport containers 22 for storing fish in RSW after catching. The vessel has transportation piping 23 for transporting the fish in RSW or to feed RSW in and out of the storage and transport containers.

The storage and transport containers 22 are connected to a pumping device 1 according to the present invention for heat exchanged of RSW and food items in RSW through the transportation piping 23 for transporting the fish in RSW or to maintain a determined temperature of the RSW during transport by circulation RSW through the pumping and heat exchange device during storage and transportation of fish.

FIG. 11 shows the vessel from FIG. 10 and demonstrates the use of the apparatus of the present invention in systems for pumping fish from an RSW vessel to shore. The problem with such a system is that the RSW is continuously pumped back to the vessel 1 for storage and transportation of the fish to shore. During this process, the RSW gets warmer which affects the quality of the fish. The embodiment shown in FIG. 11 uses the apparatus for pumping and heat exchange 1 to transport the fish in RSW through piping 23 to a tank 24 on shore and then returning the RSW back to the storage and transport containers 22 in the vessel through the pumping and heat exchange apparatus 1 to maintain a desired temperature of the RSW through the transport of fish to the tank 24 on shore.

FIG. 12 shows an embodiment of a loading structure for an apparatus with two channels, having a common inlet portion 28, feeding portion 29 which is at least partially rotating with the frame structure. In this embodiment the common inlet portion 28 is a static component connected to the partially rotating feeding portion 29 which rotates with the second heat exchange unit 4. The partially rotating feeding portion 29 has a separate connection 30 and in-feed portion of each of the spiral shaped channels. The partially rotating feeding portion 29 comprises in-feed pipes which form a curved connection to the in-feed end of each spiral shaped channels. The partially rotating in-feed pipes 29 rotate eccentrically around the central axis of the spiral shaped channels 1 of the second heat exchange unit 4.

As used herein, including in the claims, singular forms of terms are to be construed as also including the plural form and vice versa, unless the context indicates otherwise.

Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. An apparatus for heating or cooling food items in liquid, the apparatus comprising:
- a first heat exchange unit, further comprising:
  - a chamber,
  - a heat exchange device, and
  - connections for feeding a first liquid heat exchange medium to and from the chamber through the heat exchange device,
- a second heat exchange unit, further comprising:
  - one or more spiral-shaped channels for transporting food items in a second liquid heat exchange medium through,
  - an in-feed structure,
  - an out-feed structure,
- a motor for rotating the one or more spiral-shaped channels of the second heat exchange unit,
- wherein the one or more spiral-shaped channels of the second heat exchange unit are rotatable around an axis in the chamber of the first heat exchange unit, and wherein the one or more spiral-shaped channels of the second heat exchange unit are fully submerged in the first liquid heat exchange medium in the chamber of the first heat exchange unit.

2. The apparatus according to claim 1, wherein the second heat exchange unit comprises two or more parallel arranged spiral-shaped channels having a common in-feed and out-feed structure.

3. The apparatus according to claim 1, wherein the diameter of the one or more channels is narrowed and widened alternatively through each winding of the one or more spiral-shaped channels to alternate the speed of flow of liquid in the apparatus.

4. The apparatus according to claim 1, wherein the one or more spiral-shaped channels of the second heat exchange unit are made from hose or pipe like flexible material, and wherein the hose or pipe like flexible material is wound around or in a horizontally rotating frame structure forming a spiral in connection with rotating frame structure.

5. The apparatus according to claim 1, wherein the one or more spiral-shaped channels are arranged to connect an in-feed end to a common in-feed pipe, which is threaded through a centre space of the windings to exit by a last winding of the second heat exchange unit and an out-feed end of each of the one or more spiral-shaped channels are arranged to connect to a common out-feed pipe, which is threaded through the centre space of the windings to exit by a first winding of the second heat exchange unit.

6. The apparatus according to claim 1, wherein the one or more spiral-shaped channels of the second heat exchange unit are made from metal.

7. The apparatus according to claim 1, wherein the one or more spiral-shaped channels of the second heat exchange unit are a load bearing structure of the second heat exchange unit.

8. The apparatus according to claim 1, wherein the first heat exchange unit is formed as a drum unit having one or more spiral-shaped channels, and wherein each spiral-shaped channel is formed by i) an inner wall at least partially forming a hollow core, two adjacently arranged spiral shaped walls substantially perpendicularly and helically mounted around the hollow core, and iii) an outer wall arranged around the two adjacently arranged spiral shaped walls forming the channel between adjacent spiral shaped walls and the core.

9. The apparatus according to claim 1, wherein the second heat exchange unit has two or more spiral-shaped channels, and wherein the in-feed structure is designed to serially and continuously feed each channel with air-phase, liquid and food items during a full rotation of the second heat exchange.

10. The apparatus according to claim 1, wherein the in-feed structure comprises in-feed pipes being curved and rotating eccentrically to a central axis of the two or more spiral shaped channels.

11. The apparatus according to claim 1, wherein the apparatus further comprises an air/gas-duct for re-directing air/gas from the out-feed structure back to a loading structure.

12. The apparatus according to claim 1, wherein the apparatus further comprises piping for re-directing the liquid from the out-feed structure back to a loading structure.

* * * * *